J. C. STEVENS.
DIFFERENTIAL WATER STAGE RECORDER.
APPLICATION FILED DEC. 19, 1914.
1,205,679.
Patented Nov. 21, 1916.
2 SHEETS—SHEET 1.
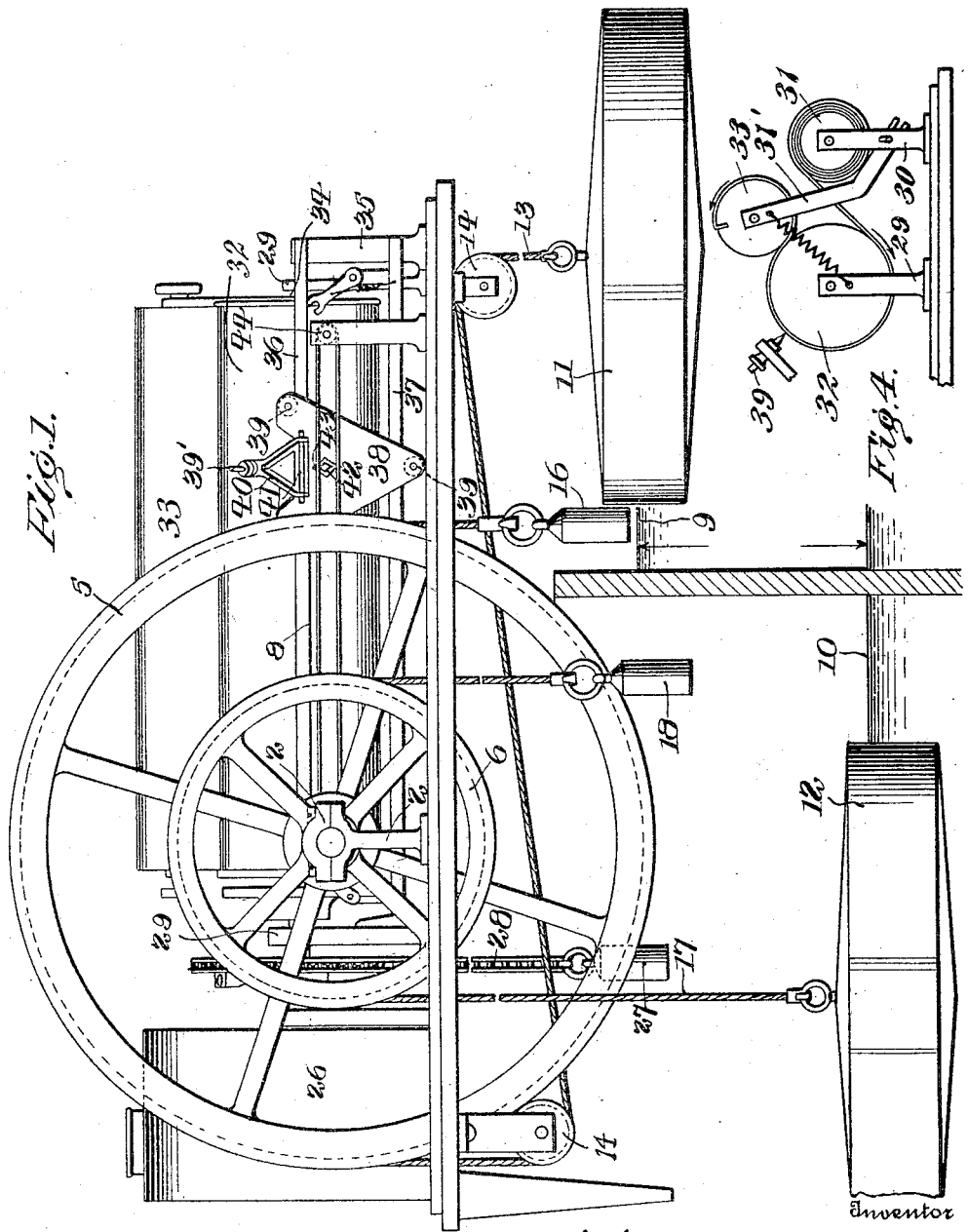

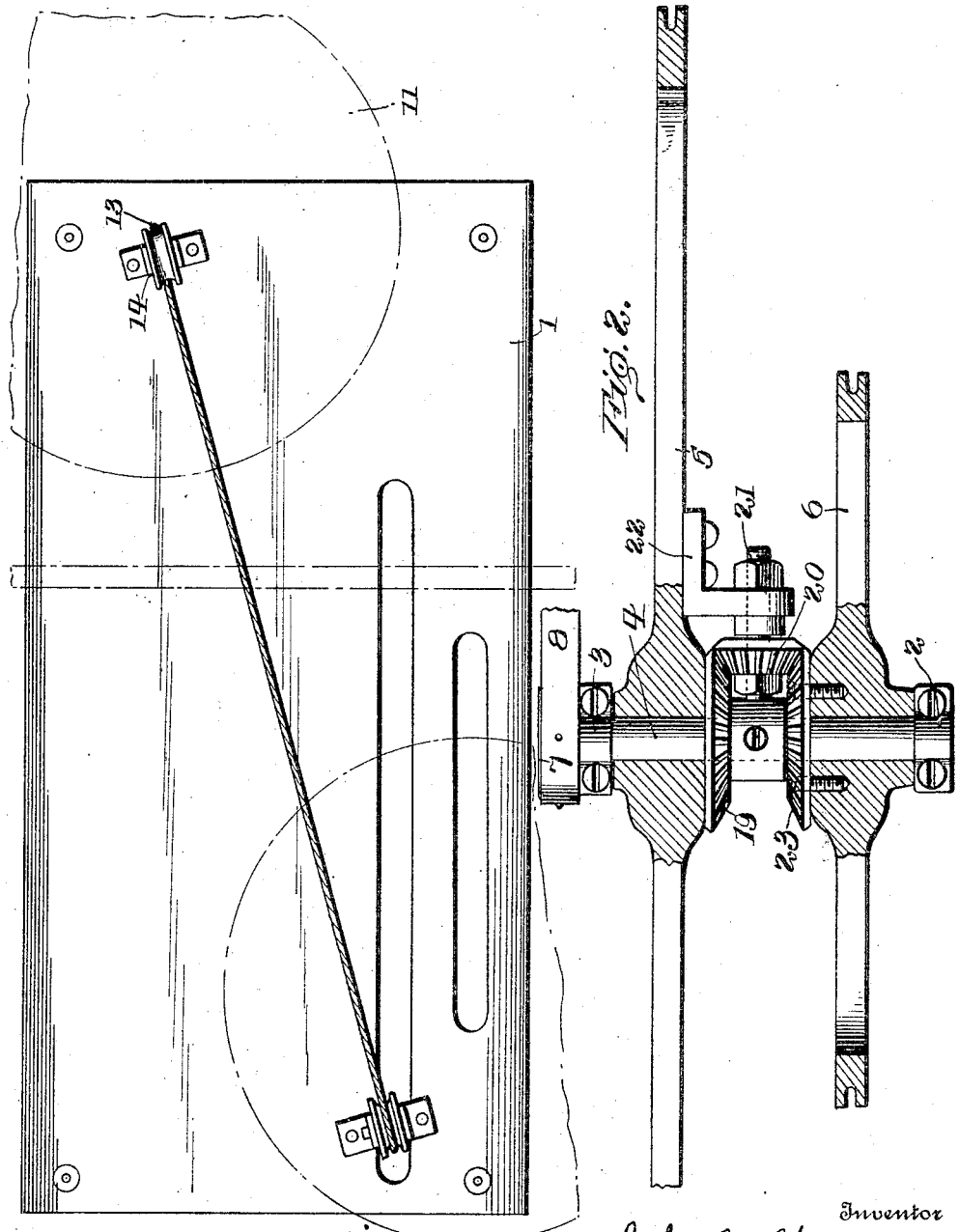

UNITED STATES PATENT OFFICE.

JOHN C. STEVENS, OF PORTLAND, OREGON, ASSIGNOR TO LEUPOLD, VOELPEL & CO., A PARTNERSHIP COMPOSED OF FREDERICK LEUPOLD, ADAM J. VOELPEL, AND JOHN C. STEVENS, OF PORTLAND, OREGON.

DIFFERENTIAL-WATER-STAGE RECORDER.

1,205,679.     Specification of Letters Patent.     Patented Nov. 21, 1916.

Application filed December 19, 1914. Serial No. 878,120.

*To all whom it may concern:*

Be it known that I, JOHN C. STEVENS, a citizen of the United States, residing at Portland, in the county of Multnomah, State of Oregon, have invented certain new and useful Improvements in Differential-Water-Stage Recorders, of which the following is a description, reference being had to the accompanying drawing and to the figures of reference marked thereon.

This invention relates to differential water stage recorders and is designed especially for water power plants, locks and tanks or wherever the net difference of water levels of two bodies of water is desired.

An object of the invention is to provide a mechanism whereby the differences in the level of two bodies of water, caused by the rising or falling of one or both of the bodies, will be accurately recorded within a predetermined limit, upon a strip of paper or other suitable recording material.

Another object of the invention is the provision of a mechanism to transform a circular motion into a linear motion without affecting the relative positions and movement of the float and marking instrument and also the provision of a power mechanism for continuously operating the recording strip or sheet.

A still further object of the invention is to provide a simple and more effective structure having certain details of structure and operation hereinafter more fully described.

In the accompanying drawings: Figure 1 is a side elevation of my improved water stage recorder; Fig. 2 is a sectional plan view of a portion of Fig. 1; and Fig. 3 is a bottom plan view of Fig. 1, partly in section. Fig. 4 is an end view showing the rollers for actuating the recording sheet.

Referring now to the drawings, 1 represents the base of my improved machine which is provided with the two standards 2 and 3 and in which is rotatably mounted the shaft 4. Mounted upon the shaft 4 are the two grooved pulley wheels 5 and 6, the pulley wheel 5 being twice as large in diameter as the pulley wheel 6, the purpose of which will be hereinafter more fully described. The shaft 4 on the outside of the standard 3 is provided with a pulley 7, which is adapted to drive the perforated endless ribbon 8 for operating the pencil for making the proper record of the difference in the elevation of the two bodies of water.

The two bodies of water are designated by the reference numerals 9 and 10 whose differences in level are to be recorded, and resting upon the body of water 9 is a float 11 and upon the body of water 10 the float 12. The float 11 has a cable 13 attached thereto which passes upwardly over the pulley 14, mounted upon the lower face of the base 1. This cable then passes across the lower face of the base over the pulley 14' and upwardly over the large grooved pulley 5 and is provided with a weight 16 adapted to cause the cable to frictionally engage the pulley 5 and cause it to oscillate with the upward and downward movement of the float 11. The float 12 has a cable 17, connected thereto, which passes upwardly over the small grooved pulley 6, and is provided with a weight 18 for causing the cable 17 to frictionally engage the pulley 6 for oscillating the pulley. The pulley 5 is loosely and rotatably mounted upon the shaft 4 and carries the bevel gear 20, mounted upon a stud 21 carried by a bracket 22 rigidly secured to the inner face of the grooved pulley 5. The beveled gear 20 is an idle gear and meshes with the two beveled gears 19 and 23. The beveled gear 19 is rigidly fixed to the shaft 4 and the beveled gear 23 is rigidly fixed to the grooved pulley 6, which in turn is loosely and rotatably mounted upon the shaft 4.

Mounted upon the base 1 is a clock mechanism 26, operated by a weight 27, through the medium of the chain or perforated band 28, and by means of which the recording sheet is continuously driven, as I will now proceed to describe. Carried by the base are suitable supports 29 and 30, in which are mounted the rollers for carrying the recording sheet. The roller 31 is mounted upon the supports 30 and carries the recording paper or sheet. The roller 32 is mounted upon the supports 29, over which the sheet passes to the roller 33, mounted upon the pivoted arms 31' carried by the support 30 and upon which is wound the recorded sheet. The roller 32 is driven by the clock mechanism, whereby the recording sheet is continuously in motion. A frictional means 34 is provided to prevent the recording sheet from unwinding too rapidly and which is fully disclosed in a co-pending application.

Mounted upon the base 1 are standards 35 carrying two parallel longitudinally arranged tracks 36 and 37, one arranged above the other and upon which is slidably mounted the marking carriage 38. This marking carriage is of a triangular form and is provided with small wheels 39 at its three corners which are adapted to travel upon the upper and lower faces of the tracks to reduce the friction of the carriage in its movement upon the tracks. This marking mechanism for recording the difference in the level of the two bodies of water is a pencil, which is indicated at 39′ and is carried by the member 40, pivotally mounted at 41 to the carriage 38, and whereby the pencil rests by gravity upon the sheet on the roller carrying the recording sheet. The carriage 38 is provided with a cam 42 which is formed within a thickened portion protruding slightly from the carriage. This cam is of a substantially diamond shape and receives a pin 43 extending from the endless band 8 which passes around the pulley 7 on the shaft 4 and around a pulley 44 mounted upon the standard carried by the base 1. This endless band is moved in either direction according to the difference in the rise and fall of the water by the mechanism heretofore described.

The pulley 5 being twice the diameter of the pulley 6, the operation of the differential device depends upon the principle that the shaft 4, and therefore the periphery of the pulley 7, will move in proportion to the difference of the peripheral velocities of the two pulleys 5 and 6. For example, if the wheel 5 is stationary and the wheel 6 turns, the pulley 7 will make the same number of revolutions as the wheel 6 and in the opposite direction, that is, the difference of water levels decreases if the float 12 rises and the pencil, through the medium of the band 8, correspondingly registers a decrease. If the float 11 rises, while 12 is stationary, the difference of water levels increases, but the shaft 4 turns twice the number of revolutions as the wheel 5 and in the same direction. But, as the pulley 5 is twice as large as the pulley 6, the pencil will register an increase to the same scale as the decrease was registered by the movement of the pulley 6. If both water levels rise or fall the same amount, the difference does not change and no movement is imparted to the pencil and thus no change of level is indicated. It is therefore evident that the pencil will always move in proportion to the changes in the difference of water levels of the two bodies of water.

Having thus described my invention, what I claim as new and desire to secure by Letters Patent, is:

1. In a differential water stage recorder, the combination with a recording sheet, a marker for the sheet, a shaft operating said marker, two pulleys of different sizes mounted upon the shaft, separate floats operating the pulleys and a differential connection between the pulleys for operating the shaft according to the differential movement of the two floats.

2. In a differential water stage recorder, the combination with a recording sheet, a marker for said sheet, a shaft operating said marker, two pulleys of different sizes mounted upon the shaft, and separate floats operating the pulleys and constructed and arranged to impart the different movements of the two floats to the shaft for moving the marker and recording the said movement.

3. In a differential water stage recorder, the combination with a recording sheet, a marker for said sheet, a shaft operating the marker, two pulleys mounted upon the shaft, floats adapted to operate said pulleys, and a differential gear connection between said pulleys whereby the differential movement of the floats is imparted to the shaft for operating the marker.

4. In a differential water stage recorder, the combination with a recording sheet, a marker for said sheet, a shaft operating the marker, a pulley loosely mounted upon the shaft, a second pulley loosely mounted upon the shaft and of a diameter less than that of the first pulley, a differential gear connection between the two pulleys, separate cables passing over the pulleys and floats carried by cables, whereby the differential movement of the two floats is imparted to the shaft to cause the marker to record it upon the sheet.

5. In a differential water stage recorder, the combination with a recording sheet, a marker for said sheet, a shaft operating the marker, a larger pulley loosely mounted upon the shaft, a beveled gear rigidly mounted upon the shaft, an idle gear carried by the pulley and meshing with the gear rigidly mounted upon the shaft, a second smaller pulley loosely mounted upon the shaft, a beveled gear rigidly carried by the smaller pulley and meshing with the idle gear carried by the larger pulley, separate cables passing over the pulleys, and floats carried by the cables whereby the differential of the two floats is imparted to the shaft to cause the marker to record it upon the sheet.

6. In a differential water stage recorder, the combination with a recording sheet, a marker for the sheet, a shaft operating said marker, two pulleys of different sizes mounted upon the shaft, separate floats operating the pulleys and a differential bevel gear connection between the pulleys for operating the shaft according to the differential movement of the two floats.

7. In a differential water stage recorder, the combination with a recording sheet, a marker for the sheet, two pulleys of different sizes, separate floats operating the pulleys, and a differential bevel gear connection between the pulleys for operating the marker according to the differential movement of the two floats.

8. In a differential water stage recorder, the combination with a recording sheet, a marker for the sheet, a rotary shaft, means operated by the shaft for operating the marker, two pulleys mounted upon the shaft, separate floats operating the pulleys, and a differential bevel gear connection between the pulleys for operating the shaft according to the differential movement of the two floats.

In testimony whereof, I affix my signature in the presence of two witnesses.

JOHN C. STEVENS.

Witnesses:
CHARLES L. STURDEVANT,
GRACE P. BRERETON.

Copies of this patent may be obtained for five cents each, by addressing the "Commissioner of Patents, Washington, D. C."